(12) United States Patent
Nowicki et al.

(10) Patent No.: US 12,111,000 B2
(45) Date of Patent: Oct. 8, 2024

(54) FLUID CONNECTION ASSEMBLY

(71) Applicant: Oetiker NY, Inc., Lancaster, NY (US)

(72) Inventors: Eric Nowicki, Buffalo, NY (US); Tracy Lynn Wopperer, East Amherst, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/246,881

(22) PCT Filed: Oct. 26, 2020

(86) PCT No.: PCT/US2020/057315
§ 371 (c)(1),
(2) Date: Mar. 28, 2023

(87) PCT Pub. No.: WO2022/093167
PCT Pub. Date: May 5, 2022

(65) Prior Publication Data
US 2023/0366498 A1    Nov. 16, 2023

(51) Int. Cl.
*F16L 37/14* (2006.01)
*F16L 37/12* (2006.01)
*F16L 37/16* (2006.01)

(52) U.S. Cl.
CPC ......... *F16L 37/144* (2013.01); *F16L 37/1225* (2013.01); *F16L 37/16* (2013.01)

(58) Field of Classification Search
CPC ..... F16L 37/082; F16L 37/12; F16L 37/1205; F16L 37/127; F16L 37/142; F16L 37/144; F16L 37/1225; F16L 37/14; F16L 37/16; F16L 37/18
See application file for complete search history.

(56) References Cited

U.S. PATENT DOCUMENTS

| | | | |
|---|---|---|---|
| 4,640,534 A | 2/1987 | Hoskins et al. |
| 4,753,458 A | 6/1988 | Case et al. |
| 4,946,205 A | 8/1990 | Washizu |
| 5,297,818 A | 3/1994 | Klinger |
| 5,459,500 A | 10/1995 | Klinger et al. |

(Continued)

FOREIGN PATENT DOCUMENTS

| | | |
|---|---|---|
| CN | 104884853 | 9/2015 |
| CN | 111594624 | 8/2020 |

(Continued)

*Primary Examiner* — Aaron M Dunwoody
(74) *Attorney, Agent, or Firm* — Harter Secrest & Emery LLP; Michael Nicholas Vranjes

(57) ABSTRACT

A fluid connection assembly, including a connector body, including a first end, a second end, a first through-bore, and a first radially outward facing surface including at least one aperture extending from the first radially outward facing surface to the first through-bore, and a retainer operatively arranged to be removably connected to the connector body, the retainer including a first section, a second section hingedly connected to the first section, a first radially inward facing surface, and at least one tab extending from the first radially inward facing surface, the at least one tab including a second radially inward facing surface, wherein, in a locked state the at least one tab extends through the at least one aperture and the first radially inward facing surface is arranged proximate the first radially outward facing surface.

20 Claims, 5 Drawing Sheets

(56) References Cited

U.S. PATENT DOCUMENTS

| | | |
|---|---|---|
| 5,468,028 A | 11/1995 | Olson |
| 5,472,242 A | 12/1995 | Petersen |
| 5,647,612 A | 7/1997 | Yoshida et al. |
| 5,681,061 A | 10/1997 | Olson |
| 5,909,901 A | 6/1999 | Zillig et al. |
| 5,979,946 A | 11/1999 | Petersen et al. |
| 6,481,086 B1 | 11/2002 | Davidson |
| 6,880,859 B2 | 4/2005 | Breay et al. |
| 6,913,294 B2 | 7/2005 | Treverton et al. |
| 7,128,347 B2 | 10/2006 | Kerin |
| 7,240,930 B2 | 7/2007 | Stravitz |
| 7,300,078 B2 | 11/2007 | Yamamoto et al. |
| 7,364,207 B2 | 4/2008 | McGee et al. |
| 7,497,477 B2 | 3/2009 | Pepe |
| 7,631,905 B2 | 12/2009 | McGee et al. |
| 7,802,822 B2 | 9/2010 | Poder et al. |
| 7,828,338 B2 | 11/2010 | Kertesz et al. |
| 7,963,570 B2 | 6/2011 | Swift et al. |
| 8,375,550 B2 | 2/2013 | Swift et al. |
| 10,221,976 B2 | 3/2019 | Kujawski et al. |
| 10,273,996 B2 | 4/2019 | Whitaker et al. |
| 10,281,075 B2 | 5/2019 | Hontz et al. |
| 10,738,926 B2 | 8/2020 | Stieler |
| 11,092,269 B2 | 8/2021 | Kujawski, Jr. et al. |
| 2008/0111376 A1 | 5/2008 | Ferrero |
| 2009/0119886 A1 | 5/2009 | Werth |
| 2011/0006517 A1 | 1/2011 | Nakata |
| 2011/0101674 A1 | 5/2011 | Benvenuto et al. |
| 2016/0363247 A1 | 12/2016 | McCure |
| 2017/0114935 A1 | 4/2017 | Kujawski, Jr. et al. |
| 2017/0254453 A1 | 9/2017 | Fremont et al. |
| 2018/0328525 A1 | 11/2018 | Kerin, Jr. |
| 2019/0063656 A1 | 2/2019 | Kujawski, Jr. |
| 2020/0362801 A1* | 11/2020 | Flach ............... F02M 35/10209 |

FOREIGN PATENT DOCUMENTS

| | | |
|---|---|---|
| CN | 212251624 | 12/2020 |
| EP | 1719944 | 11/2006 |
| EP | 1939514 | 7/2008 |
| EP | 3361134 | 8/2018 |
| EP | 3430302 | 4/2020 |
| JP | 4703885 | 6/2011 |
| JP | 5743765 | 7/2015 |
| JP | 2021001626 | 1/2021 |

\* cited by examiner

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2020/057315, filed on Oct. 26, 2020, which application is hereby incorporated by reference in its entirety.

FIELD

The present disclosure relates to fluid connectors, and, more particularly, to a fluid connection assembly including a retainer that decreases the insertion force required for assembly and allows for quick assembly without the need for tools.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Another example of fluid traveling between components is refrigeration lines, which may carry a refrigerant. A refrigerant is a substance or mixture, usually a fluid, used in a heat pump and refrigeration cycle, and can be hazardous. As such, it is essential that fluid connectors for refrigeration lines be properly secured so as not to allow the release of any refrigerant.

Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, during the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

An example of a current fluid connection assembly design is the bolted flange, which reduces space efficiency. Torque applied to the bolt may cause unnecessary damage to the connection or components thereof, and requires tools to assemble. Another example of a current fluid connection assembly design is a quick connector comprising a retaining clip. The retaining clip design allows for increased joint movement, increased seal contamination, and is largely unable to meet performance criteria for extreme refrigerant conditions in its current state.

Thus, there has been a long-felt need for a fluid connection assembly including a retainer that allows for disassembly and reduces the insertion force required to assemble the fluid connector.

SUMMARY

According to aspects illustrated herein, there is provided a fluid connection assembly, comprising a connector body, including a first end, a second end, a first through-bore, and a first radially outward facing surface including at least one aperture extending from the first radially outward facing surface to the first through-bore, and a retainer operatively arranged to be removably connected to the connector body, the retainer including a first section, a second section hingedly connected to the first section, a first radially inward facing surface, and at least one tab extending from the first radially inward facing surface, the at least one tab including a second radially inward facing surface, wherein, in a locked state the at least one tab extends through the at least one aperture and the first radially inward facing surface is arranged proximate the first radially outward facing surface.

In some embodiments, in the locked state, the second section is fixedly secured to the first section. In some embodiments, the at least one aperture comprises a first aperture and a second aperture, the at least one tab comprises a first tab and a second tab, and in the locked state, the first tab extends through the first aperture and the second tab extends through the second aperture. In some embodiments, in the locked state, the first tab is arranged at an angle relative to the second tab, the angle being greater than 90° and less than 180°. In some embodiments, the first section comprises a male connector including a radially outward extending projection. In some embodiments, the second section comprises a female connector including an aperture, the aperture operatively arranged to engage the radially outward extending projection to fixedly secure the second section to the first section. In some embodiments, the male connector further comprises a channel, the female connector further comprises a projection, and the projection is operatively arranged to engage the channel to align the aperture with the radially outward extending projection. In some embodiments, the second radially inward facing surface is curvilinear. In some embodiments, the fluid connection assembly further comprises a tube including a shoulder, wherein the retainer is arranged to secure the tube to the connector body. In some embodiments, the at least one tab is operatively arranged to engage the shoulder. In some embodiments, the tube further comprises a radially inward extending groove arranged proximate the shoulder, and in the locked state, the at least one tab is engaged with the groove.

According to aspects illustrated herein, there is provided a fluid connection assembly, comprising a connector body, including a first end, a second end, a first through-bore, and a first radially outward facing surface including a first groove and at least one aperture, the at least one aperture arranged in the first groove and extending from the first radially outward facing surface to the first through-bore, and a retainer operatively arranged to be removably connected to the connector body, the retainer including a first section, a second section hingedly connected to the first section, a first radially inward facing surface, and at least one tab extending radially inward from the first radially inward facing surface, the at least one tab including a second radially inward facing surface, and a tube including a shoulder, wherein, in a locked state the at least one tab extends through the at least one aperture and engages the shoulder.

In some embodiments, in the locked state, the second section is fixedly secured to the first section. In some embodiments, the first section comprises a male connector including a radially outward extending projection, the second section comprises a female connector including an aperture, and the aperture is operatively arranged to engage the radially outward extending projection to fixedly secure the second section to the first section. In some embodiments, the male connector further comprises a channel, the female connector further comprises a projection, and the projection is operatively arranged to engage the channel to align the aperture with the radially outward extending projection. In some embodiments, the at least one aperture comprises a first aperture and a second aperture, the at least one tab comprises a first tab and a second tab, and in the locked state, the first tab extends through the first aperture and the second tab extends through the second aperture. In some embodiments, in the locked state, the first tab is arranged at an angle relative to the second tab, the angle being greater than 90° and less than 180°. In some embodiments, the second radially inward facing surface is curvilinear. In some embodiments, the tube further comprises a radially inward extending groove arranged proximate the shoulder, and in the locked state, the at least one tab is engaged with the groove. In some embodiments, the first section comprises a first width and the at least one tab comprises a second width, the second width being less than the first width.

According to aspects illustrated herein, there is provided a fluid connection assembly that provides a stable and reliable connection between a tube and a connector body, and allows for quick assembly. The fluid connection assembly of the present disclosure is space efficient, requires a low insertion force for assembly (i.e., insertion of the tube into the connector body), is easy to assemble and doesn't require tools, and is serviceable (i.e., can be easily disassembled). In some embodiments, the fluid connection assembly comprises a plastic retainer that provides increased stability to reduce joint movement (i.e., angular or axial displacement of the tube with respect to the connector body).

According to aspects illustrated herein, there is provided a fluid connection assembly comprising a snap on plastic retainer including a living hinge that traps/secures a standard Society of Automotive Engineers (SAE) end form or tube inside of a connector body using inner tabs that fit into slots on the connector body and lock around the inserted tube. In the locked position, the plastic retainer securely holds the tube in place and can be unlocked for serviceability. Tabs arranged on the retainer also provide a greater defense to seal contamination (they prevent ingress of foreign material into the connection).

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
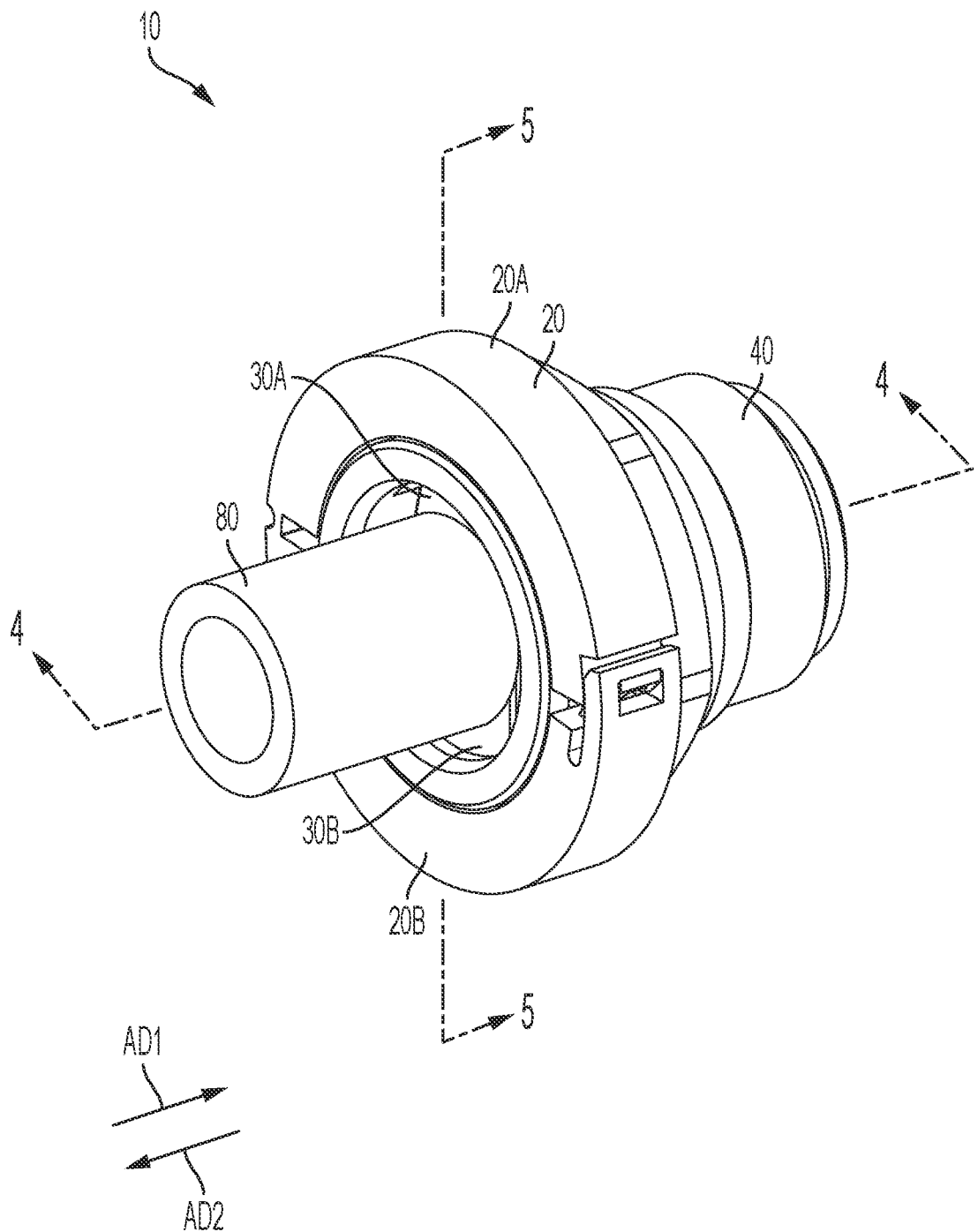
FIG. 1 is a perspective view of a fluid connection assembly, in a locked state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
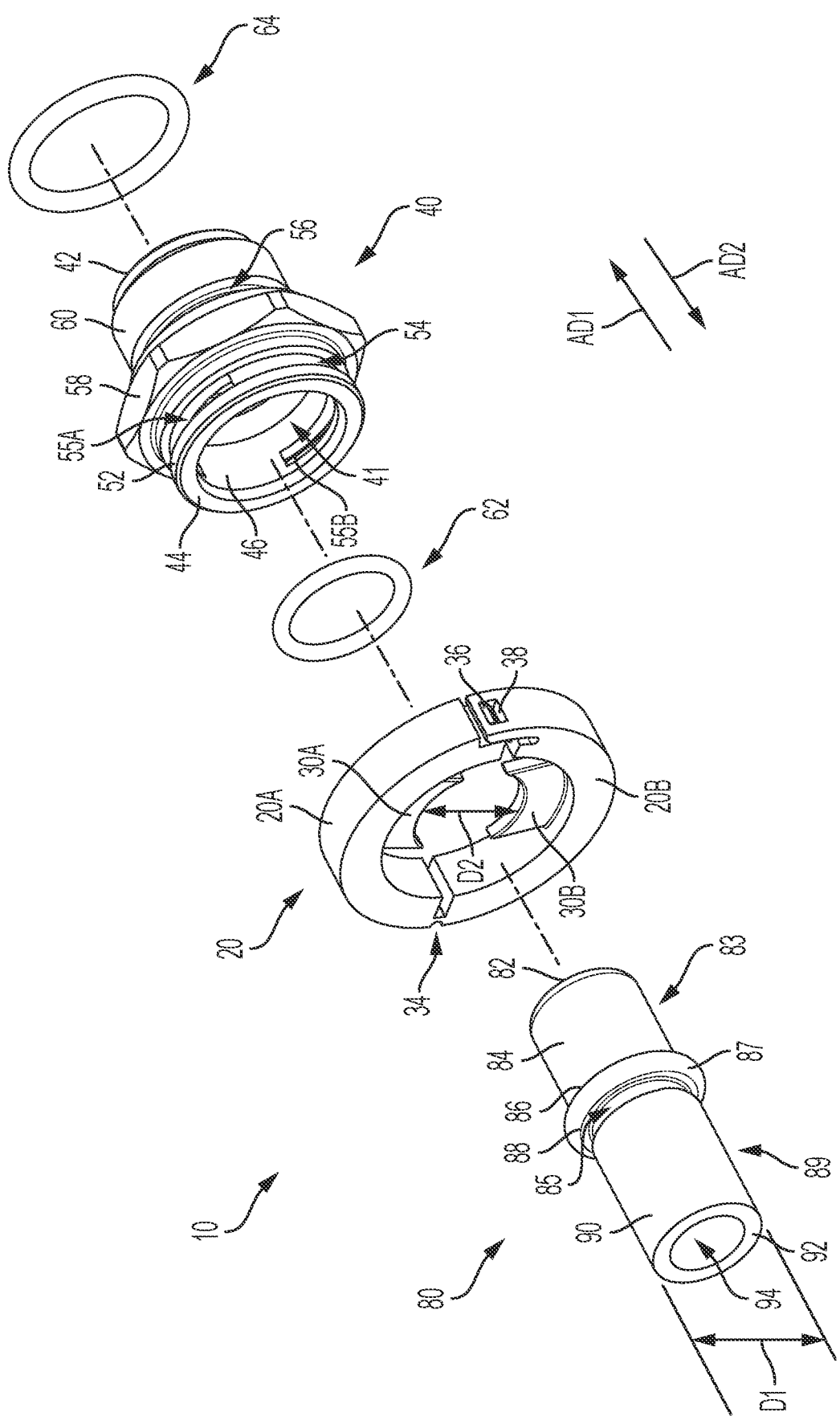
FIG. 2 is an exploded perspective view of the fluid connection assembly shown in FIG. 1.

Adverting now to the figures, FIG. 1 is a perspective view of fluid connection assembly 10, in a locked state. FIG. 2 is an exploded perspective view of fluid connection assembly 10. Fluid connection assembly 10 generally comprises retainer 20, tube 80, and connector body 40. The following description should be read in view of FIGS. 1-2.

Tube 80 comprises end 82, section 83, bead or shoulder 87, section 89, end 92, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 4). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increases in diameter in axial direction AD2. In some embodiments, surface 86 may comprise linear portion and a conical or frusto-conical portion. Section 89 is arranged between shoulder 87 and end 92 and comprises radially outward facing surface 90. Radially outward facing surface 90 includes a substantially constant diameter. Tube 80 (or section 89) further comprises radially inward extending groove 85. In some embodiments, groove 85 is arranged in radially outward facing surface 90 immediately adjacent to shoulder 87. In some embodiments, groove 85 is spaced apart from shoulder 87, for example in axial direction AD2. Groove 85 is operatively arranged to engage tabs 30A-B such that retainer 20 may only lock when properly aligned with tube 80, as will be described in greater detail below. Tube 80 is arranged to be inserted, specifically with end 82 first, into connector body 40.

Figure 4:
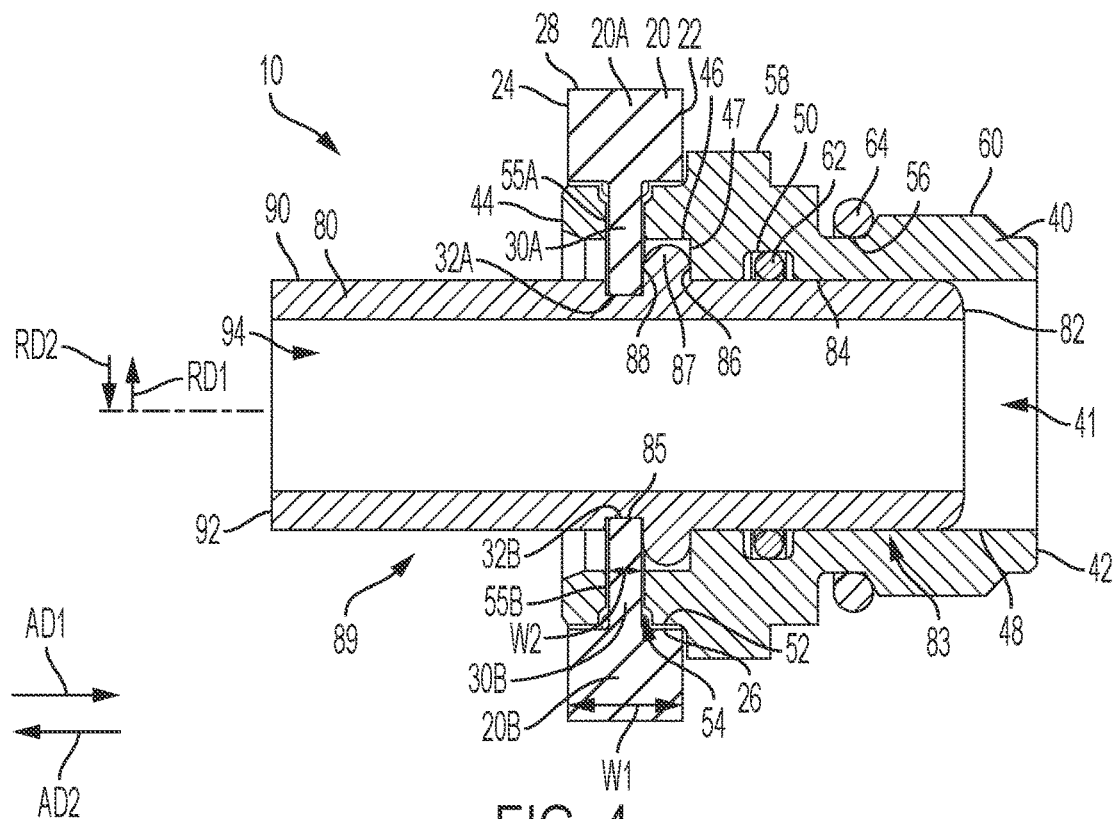
FIG. 4 is a cross-sectional view of the fluid connection assembly taken generally along line 4-4 in FIG. 1; and, FIG. 5 is a cross-sectional view of the fluid connection assembly taken generally along line 5-5 in FIG. 1.

Tube 80 is inserted into connector body 40 until section 83, or radially outward facing surface 84, engages seal 62 (see FIG. 4). Shoulder 87 is engaged with or arranged proximate to or abuts against surface 47 of connector body 40 and groove 85 is axially aligned with apertures 55A-B, at which point retainer 20 is assembled to secure tube 80 to connector body 40. Tube 80, specifically radially outward facing surface 90, comprises diameter D1. Radially inward facing surfaces 32A-B of tabs 30A-B, respectively, form diameter D2, which is less than diameter D1. The diameter of groove 85 corresponds to diameter D2 such that retainer 20 may only be locked (i.e., male connector 36 engages female connector 38) when tabs 30A-B engage groove 85. The assembly of retainer 20 onto connector body 40 to lock tube 80 therein will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal. In some embodiments, tube 80 comprises a polymer. In some embodiments, tube 80 comprises a ceramic.

Figure 3A:
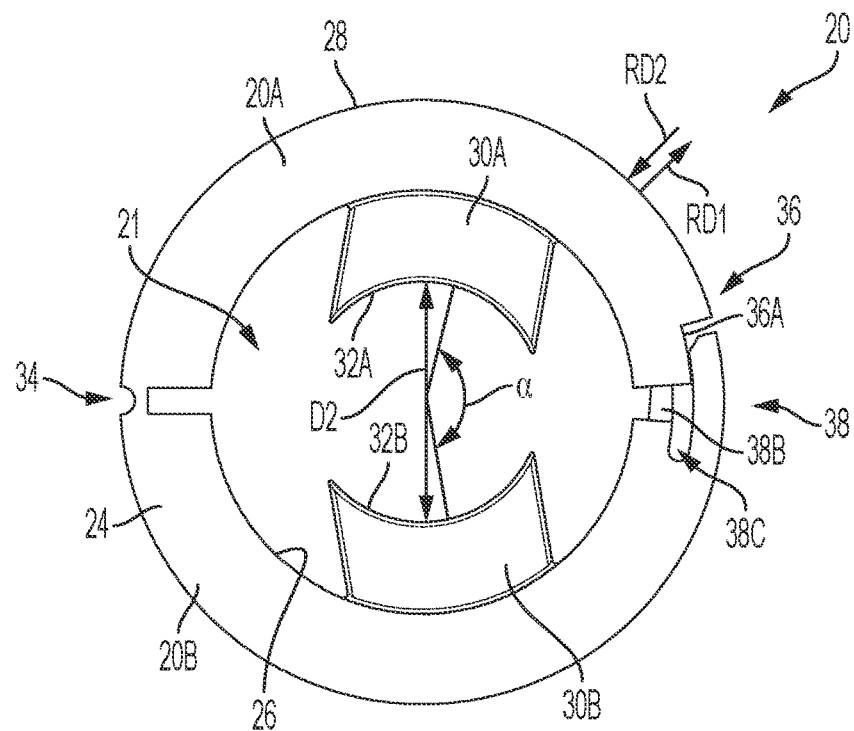
FIG. 3A is an elevational view of the retainer shown in FIG. 1.
Figure 3B:
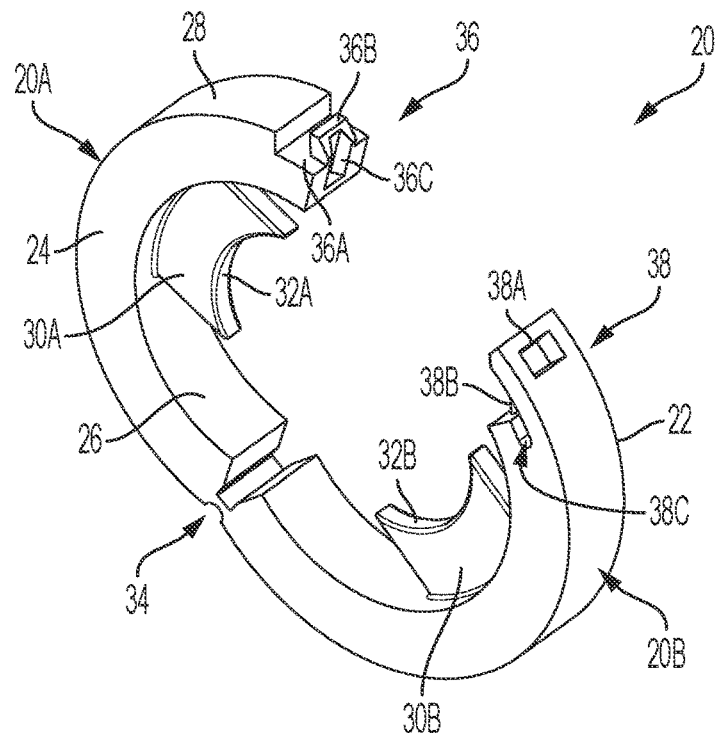
FIG. 3B is a front perspective view of the retainer shown in FIG. 1, in an unlocked state.
Figure 3C:
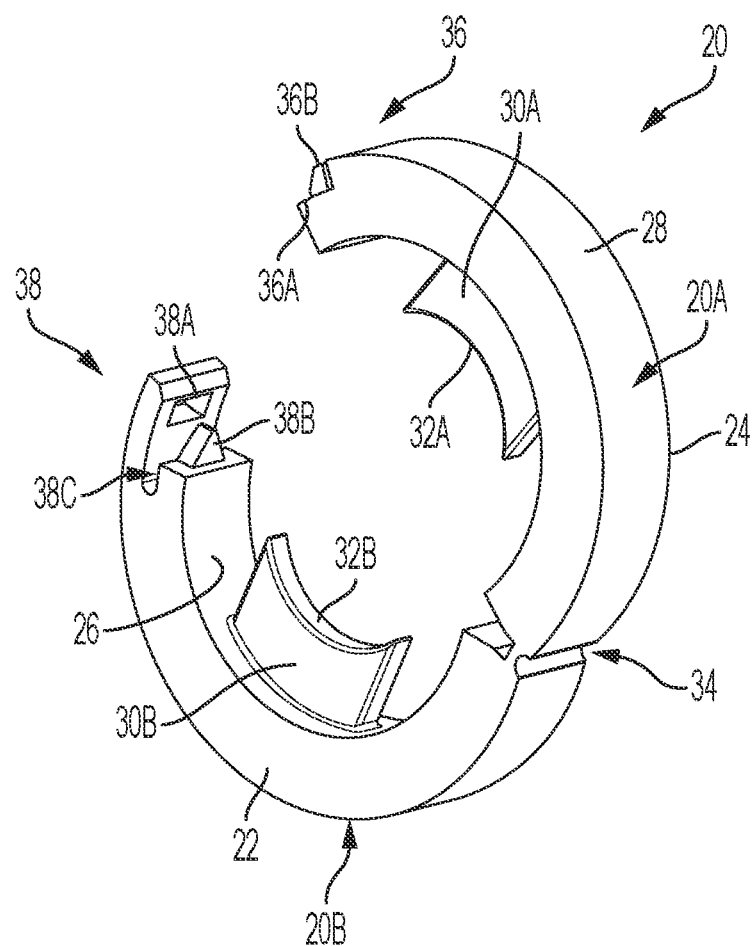
FIG. 3C is a rear perspective view of the retainer shown in FIG. 3B.
Figure 5:
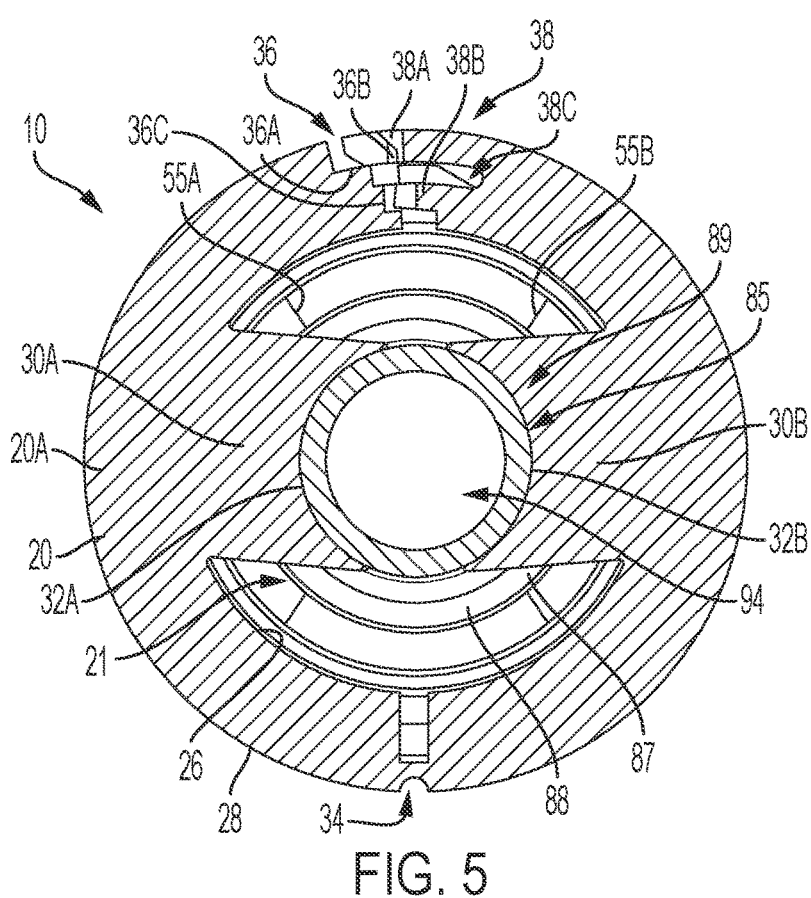

FIG. 3A is an elevational view of retainer 20. FIG. 3B is a front perspective view of retainer 20, in an unlocked state. FIG. 3C is a rear perspective view of retainer 20, in the unlocked state. FIG. 4 is a cross-sectional view of fluid connection assembly 10 taken generally along line 4-4 in FIG. 1. FIG. 5 is a cross-sectional view of fluid connection assembly 10 taken generally along line 5-5 in FIG. 1. The following description should be read in view of FIGS. 1-5.

Retainer 20 generally comprises section 20A, section 20B, end 22, end 24, radially inward facing surface 26, and radially outward facing surface 28. In some embodiments, section 20A is hingedly connected to section 20B, via, for example, hinge 34. In some embodiments, section 20A is removably connected to section 20B. When sections 20A and 20B are connected or retainer 20 is in the locked state (FIG. 3A), hole 21 is formed therebetween; however, it should be appreciated that even in the unlocked state, it could be said that each of sections 20A and 20B include a respective hole 21.

Radially inward facing surface 26 is operatively arranged to engage or abut against radially outward facing surface 52 of connector body 40. Retainer 20 further comprises one or more tabs (e.g., tab 32A and tab 32B) extending radially inward in radial direction RD2 from radially inward facing surface 26. In the locked state, and as best seen in FIGS. 4-5, radially inward facing surface 26 engages or abuts against or is arranged proximate to radially outward facing surface 52, and end 22 engages or abuts against or is arranged proximate to head 58. Also, tab 30A extends through aperture 55A and engages radially outward facing surface 90 and shoulder 87, specifically surface 88, and tab 30B extends through aperture 55B and engages radially outward facing surface 90 and shoulder 87, specifically surface 88, to lock tube 80 within connector body 40. In some embodiments, and as shown, tab 30A and tab 30B engage groove 85 in order to form the locked state. In such embodiments, retainer 20 is incapable of locking unless tabs 30A-B engage groove 85. Tab 30A comprises radially inward facing surface 32A, which comprises a curvilinear surface that is substantially equal to the curvilinear surface of groove 85 (i.e., radially inward facing surface 32A and groove 85 have substantially the same diameter). Tab 30B comprises radially inward facing surface 32B which comprises a curvilinear surface that is substantially equal to the curvilinear surface of groove 85 (i.e., radially inward facing surface 32B and groove 85 have substantially the same diameter). When in the locked state, each of radially inward facing surfaces 32A and 32B comprise diameter D2, which is less than diameter D1 of radially outward facing surface 90. Thus, when tabs 30A-B are axially aligned with groove 85, retainer 20 is capable of locking; however, when tabs 30A-B are not axially aligned with groove 85, retainer 20 is not capable of locking. For example, if tabs 30A-B are aligned with radially outward facing surface 90, since diameter D1 is greater than diameter D2, male connector 36 will not be capable of engaging with female connector 38. Tab 30A is arranged at angle α relative to tab 30B. In some embodiments, angle α is greater than 90° and less than 180°. In some embodiments, angle α is greater than or equal to 180°. In some embodiments angle α is less than or equal to 90°. It should be appreciated that tabs 30A and 30B are solid components including a substantial width that circumscribes tube 80 in the locked state. The design of tabs 30A and 30B prevent ingress of foreign material into fluid connection assembly 10 that may jeopardize the seal between tube 80 and connector body 40 (i.e., O-ring 62). As best seen in FIG. 4, section 20A and/or section 20B comprise width W1 and tab 30A and/or tab 30B comprise width W2. Width W2 is less than width W1. This design is important because it allows sections 20A-B to abut against radially outward facing surface 52 when tabs 30A-B are fully inserted in apertures 55A-B, respectively (i.e., preventing over insertion of tabs 30A-B). In some embodiments, retainer 20 comprises a polymer. In some embodiments, retainer 20 comprises a metal. In some embodiments, retainer 20 comprises a ceramic.

Section 20A comprises male connector 36 and section 20B comprises female connector 38. As shown, male connector 36 on section 20A is arranged to engage female connector 38 on section 20B such that sections 20A and 20B are fixedly secured. In some embodiments, male connector 36 is hook-shaped (in a radially outward direction) and includes groove 36A and projection 36B. Groove 36A is arranged in radially outward facing surface 28. Projection 36B extends generally radially outward in radial direction RD1 from groove 36A. In some embodiments, projection 36B comprises a tapered section near its top end operatively arranged to allow engagement of projection 36B with female connector 38, specifically, aperture 38A, to occur with greater ease. Projection 36B further comprises channel 36C. Channel 36C comprises a bottom portion, and two tapered side wall portions extending from the bottom portion. Channel 36C is arranged to engage projection 38B of female connector 38 in order to properly align projection 36B with aperture 38A.

Female connector 38 comprises aperture 38A extending radially inward from radially outward facing surface 28. Aperture 38A is operatively arranged to engage projection 36B to lock section 20B to section 20A. Female connector 38 further comprises projection 38B. In some embodiments, projection 38B is arranged proximate to radially inward facing surface 26 and includes at least two tapered surfaces. The tapered surfaces of projection 38B are arranged to engage channel 36C to accurately align projection 36B with aperture 38A. In some embodiments, female connector 38 further comprises radial gap 38C arranged radially between aperture 38A and projection 38B. Radial gap 38C is operatively arranged to allow radial displacement of female connector 38. For example, as section 20B is displaced toward section 20A, female connector 38 engages projection 36B and displaces radially outward in radial direction RD1. Once aperture 38A is aligned with projection 36B, female connector 38 snaps back radially inward, in radial direction RD2, thereby securing section 20B to section 20A. Gap 38C allows for this increased radial flexion of female connector 38.

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed in is a condenser, evaporator, or pump. It should be appreciated that fluid connector 10 may be used in various other components, assemblies, and subassemblies in which fluid connection is desired. Radially outward facing surface 60 may further comprise groove 56. Seal or O-ring 64 is arranged in groove 56 to create a fluid tight seal between connector body 40 and the component it is connected to. Seal 62 is arranged in connector body 40. Specifically, seal 62 is arranged in groove 50 to engage tube 80 (i.e., radially outward facing surface 84). Groove 50 is arranged in radially inward facing surface 48. In some embodiments, seal 62 is an O-ring. In some embodiments, and as shown, radially inward facing surface 46 is a substantially cylindrical surface. In some embodiments, radially inward facing surface 46 comprises a frusto-conical surface or radially outward extending taper proximate end 44. In some embodiments, radially inward facing surface 48 is a substantially cylindrical surface. Surface 47 connects surface 46 and surface 48. In some embodiments, surface 47 is an axially facing surface. In some embodiments, surface 47 is a frusto-conical surface. Surface 47 is operatively arranged to engage shoulder 87, specifically, to prevent axial displacement of tube 80 is axial direction AD1. Groove 54 is arranged in radially outward facing surface 52. Groove 54 is arranged axially between end 44 and head 58. In some embodiments, groove 54 is arranged axially between and spaced apart from end 44 and head 58. Connector body 40 further comprises one or more apertures (e.g., apertures 55A and 55B) arranged in radially outward facing surface 52. Specifically, apertures 55A and 55B are arranged in groove 54 and extend from radially outward facing surface 52 to through-bore 41. Apertures 55A and 55B are operatively arranged to allow tabs 30A and 30B to extend therethrough and engage shoulder 87 to secure tube 80 within connector body 40. In some embodiments, connector body 40 comprises a metal. In some embodiments, connector body 40 comprises a polymer. In some embodiments, connector body 40 comprises a ceramic.

To assemble fluid connection assembly 10, tube 80 is inserted in axial direction AD1, with end 82 first, into connector body 40. Radially outward facing surface 84 engages seal 62, section 83 is arranged inside of connector body 40 proximate radially inward facing surface 48, shoulder 87 is arranged inside of connector body 40 proximate surface 47 and/or radially inward facing surface 46, section 89 is arranged at least partially inside of connector body 40 proximate radially inward facing surface 46, and groove 85 is axially aligned with apertures 55A-B. Then, retainer 20 is secured over connector body 40. Specifically, sections 20A and 20B are arranged over connector body 40 such that tabs 30A and 30B are aligned with groove 54, and more specifically, apertures 55A and 55B, respectively. Sections 20A and 20B are displaced radially inward toward each other (i.e., in radial direction RD2) until female connector 38 fully engages male connector 36 and retainer 20 is in the locked position. As previously described, engagement of female connector 38 with male connector 36 can only occur if tabs 30A-B engage groove 85. Engagement of female connector 38 with male connector 36 cannot occur if tabs 30A-B engage radially outward facing surface 90. In the locked position, radially inward facing surface 26 engages radially outward facing surface 52, tab 30A extends through aperture 55A and radially inward facing surface 32A engages groove 85 and surface 88, and tab 30B extends through aperture 55B and radially inward facing surface 32B engages groove 85 and surface 88. In some embodiments, end 22 engages head 58. The engagement of retainer 20 with connector body 40 and tube 80 prevents axial displacement of tube 80 in axial directions AD1 and AD2, as well as radial directions RD1 and RD2, relative to connector body 40. To disassemble, female connector 38 is displaced radially outward in radial direction RD1 with respect to male connector 36 until aperture 38A disengages projection 36B. Sections 20A and 20B are then separated to disengage tabs 30A and 30B from shoulder 87, at which point tube 80 can be removed from connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22 End
24 End
26 Radially inward facing surface
28 Radially outward facing surface
30A Tab
30B Tab
32A Radially inward facing surface
32B Radially inward facing surface
34 Hinge
36 Male connector
36A Groove
36B Projection
36C Channel
38 Female connector
38A Aperture
38B Projection
38C Gap
40 Connector body
41 Through-bore
42 End
44 End
46 Radially inward facing surface
47 Surface
48 Radially inward facing surface
50 Groove
52 Radially outward facing surface
54 Groove
55A Aperture
55B Aperture
56 Groove
58 Head
60 Radially outward facing surface
62 Seal
64 Seal
80 Tube
82 End
83 Section
84 Radially outward facing surface
85 Groove
86 Surface
87 Shoulder or bead
88 Surface
89 Section
90 Radially outward facing surface
92 End
94 Through-bore
D1 Diameter
D2 Diameter
AD1 Axial direction
AD2 Axial direction
RD1 Radial direction
RD2 Radial direction
W1 Width
W2 Width
α Angle

What is claimed is:

1. A fluid connection assembly, comprising:
   a connector body, including:
      a first end;
      a second end;
      a first through-bore; and
      a first radially outward facing surface including at least one aperture extending from the first radially outward facing surface to the first through-bore; and
   a retainer operatively arranged to be removably connected to the connector body, the retainer including:
      a first section;
      a second section hingedly connected to the first section via a hinge;
      a first radially inward facing surface; and
      at least one tab extending from the first radially inward facing surface, the at least one tab including a second radially inward facing surface;
   wherein, in a locked state the at least one tab extends through the at least one aperture and the first radially inward facing surface is arranged proximate the first radially outward facing surface.

2. The fluid connection assembly as recited in claim 1, wherein in the locked state, the second section is fixedly secured to the first section.

3. The fluid connection assembly as recited in claim 1, wherein:

the at least one aperture comprises a first aperture and a second aperture;

the at least one tab comprises a first tab and a second tab; and in the locked state, the first tab extends through the first aperture and the second tab extends through the second aperture.

4. The fluid connection assembly as recited in claim 3, wherein in the locked state, the first tab is arranged at an angle relative to the second tab, the angle being greater than 90° and less than 180°.

5. The fluid connection assembly as recited in claim 1, wherein the first section comprises a male connector including a radially outward extending projection.

6. The fluid connection assembly as recited in claim 5, wherein the second section comprises a female connector including an aperture, the aperture operatively arranged to engage the radially outward extending projection to fixedly secure the second section to the first section.

7. The fluid connection assembly as recited in claim 6, wherein:

the male connector further comprises a channel;

the female connector further comprises a projection; and the projection is operatively arranged to engage the channel to align the aperture with the radially outward extending projection.

8. The fluid connection assembly as recited in claim 1, wherein the second radially inward facing surface is curvilinear.

9. The fluid connection assembly as recited in claim 1, further comprising a tube including a shoulder, wherein the retainer is arranged to secure the tube to the connector body.

10. The fluid connection assembly as recited in claim 9, wherein the at least one tab is operatively arranged to engage the shoulder.

11. The fluid connection assembly as recited in claim 9, wherein:

the tube further comprises a radially inward extending groove arranged proximate the shoulder; and in the locked state, the at least one tab is engaged with the groove.

12. A fluid connection assembly, comprising:

a connector body, including:

a first end;

a second end;

a first through-bore; and a first radially outward facing surface including a first groove and at least one aperture, the at least one aperture arranged in the first groove and extending from the first radially outward facing surface to the first through-bore;

a retainer operatively arranged to be removably connected to the connector body, the retainer including:

a first section;

a second section hingedly connected to the first section via a hinge;

a first radially inward facing surface; and at least one tab extending radially inward from the first radially inward facing surface, the at least one tab including a second radially inward facing surface; and a tube including a shoulder;

wherein, in a locked state the at least one tab extends through the at least one aperture and engages the shoulder.

13. The fluid connection assembly as recited in claim 12, wherein in the locked state, the second section is fixedly secured to the first section.

14. The fluid connection assembly as recited in claim 12, wherein:

the first section comprises a male connector including a radially outward extending projection;

the second section comprises a female connector including an aperture; and the aperture is operatively arranged to engage the radially outward extending projection to fixedly secure the second section to the first section.

15. The fluid connection assembly as recited in claim 14, wherein:

the male connector further comprises a channel;

the female connector further comprises a projection; and the projection is operatively arranged to engage the channel to align the aperture with the radially outward extending projection.

16. The fluid connection assembly as recited in claim 12, wherein:

the at least one aperture comprises a first aperture and a second aperture;

the at least one tab comprises a first tab and a second tab; and in the locked state, the first tab extends through the first aperture and the second tab extends through the second aperture.

17. The fluid connection assembly as recited in claim 16, wherein in the locked state, the first tab is arranged at an angle relative to the second tab, the angle being greater than 90° and less than 180°.

18. The fluid connection assembly as recited in claim 12, wherein the second radially inward facing surface is curvilinear.

19. The fluid connection assembly as recited in claim 12, wherein the first section comprises a first width and the at least one tab comprises a second width, the second width being less than the first width.

20. A fluid connection assembly, comprising:

a connector body, including:

a first end;

a second end;

a first through-bore; and a first radially outward facing surface including at least one aperture extending from the first radially outward facing surface to the first through-bore; and a retainer operatively arranged to be removably connected to the connector body, the retainer including:

a first section comprising a male connector including a radially outward extending projection;

a second section hingedly connected to the first section, the second section comprising a female connector including an aperture, wherein the aperture is operatively arranged to engage the radially outward extending projection to fixedly secure the second section to the first section;

a first radially inward facing surface; and at least one tab extending from the first radially inward facing surface, the at least one tab including a second radially inward facing surface;

wherein, in a locked state the at least one tab extends through the at least one aperture.

* * * * *